United States Patent
Hsieh

(10) Patent No.: US 9,401,113 B2
(45) Date of Patent: *Jul. 26, 2016

(54) LOW COLOR SHIFT MULTI-VIEW DISPLAY DEVICE AND DISPLAY METHOD THEREOF

(71) Applicant: Innolux Corporation, Miao-Li County (TW)

(72) Inventor: Ming-Feng Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,990

(22) Filed: Apr. 16, 2015

(65) Prior Publication Data

US 2015/0222887 A1    Aug. 6, 2015

Related U.S. Application Data

(60) Continuation of application No. 14/318,743, filed on Jun. 30, 2014, now Pat. No. 9,208,729, which is a continuation of application No. 13/942,898, filed on Jul. 16, 2013, now Pat. No. 9,013,521, which is a division of application No. 12/512,123, filed on Jul. 30, 2009, now Pat. No. 8,519,995.

(30) Foreign Application Priority Data

Aug. 7, 2008    (TW) .................................. 97130110

(51) Int. Cl.
*G06F 3/038* (2013.01)
*G09G 5/00* (2006.01)
(Continued)

(52) U.S. Cl.
CPC .............. *G09G 3/3413* (2013.01); *G09G 3/003* (2013.01); *G09G 3/2003* (2013.01); *G09G 3/3607* (2013.01); *G09G 3/3611* (2013.01); *H04N 13/0422* (2013.01); *H04N 13/0445* (2013.01)

(58) Field of Classification Search
CPC .................. G09G 2320/0276; G09G 2360/16; G09G 2320/26
USPC .................. 345/7–9, 87–100, 204, 690–694; 349/56
See application file for complete search history.

(56) References Cited

U.S. PATENT DOCUMENTS 5,936,596  A    8/1999   Yoshida et al.
7,123,223  B2   10/2006  Moon
(Continued)

FOREIGN PATENT DOCUMENTS

CN    101025494    8/2007
TW    200614140 A  5/2006
TW    200820189 A  5/2008

OTHER PUBLICATIONS

Taiwan Intellectual Property Office, Office Action mailed Nov. 28, 2012 in TW Application No. 10121344010.
(Continued)

*Primary Examiner* — Kimnhung Nguyen
(74) *Attorney, Agent, or Firm* — McClure, Qualey & Rodack, LLP

(57) ABSTRACT

According to various embodiments of the invention, gamma curves for multiple pixel groups can be calibrated using look-up tables or by using reference voltage groups provided by gamma voltage generators so that the pixels can display multiple images with correct gray levels at different view angles. Therefore, color shift can be avoided or lessened without necessarily using extra circuitry on the display panel. Also, any related light transmittance or light utilization efficiency reduction may be decreased or eliminated.

6 Claims, 5 Drawing Sheets

(51) Int. Cl.
*G09G 3/34* (2006.01)
*G09G 3/00* (2006.01)
*G09G 3/36* (2006.01)
*H04N 13/04* (2006.01)
*G09G 3/20* (2006.01)

(56) References Cited

U.S. PATENT DOCUMENTS

| | | | |
|---|---|---|---|
| 7,973,751 | B2 | 7/2011 | Lee |
| 8,009,130 | B2 | 8/2011 | Kim et al. |
| 8,013,818 | B2 | 9/2011 | You |
| 8,519,995 | B2 * | 8/2013 | Hsieh .................... G09G 3/003 345/213 |
| 2004/0001167 | A1 | 1/2004 | Takeuchi et al. |
| 2005/0140604 | A1 | 6/2005 | Shin |
| 2006/0103615 | A1 | 5/2006 | Shih et al. |
| 2008/0140604 | A1 | 6/2008 | Collier et al. |
| 2008/0150853 | A1 | 6/2008 | Peng et al. |

OTHER PUBLICATIONS

State Intellectual Property Office of the People's Republic of China, Office Action mailed Aug. 20, 2012 in Chinese application/publication No. 200810178650.X/2012081500915330.

Non-Final Office Action issued by the USPTO for U.S Appl. No. 13/942,913, filed Jul. 16, 2013, mailed Sep. 27, 2013.

* cited by examiner

LOW COLOR SHIFT MULTI-VIEW DISPLAY DEVICE AND DISPLAY METHOD THEREOF

CROSS-REFERENCE TO RELATED APPLICATION

This application is a continuation application of co-pending application Ser. No. 14/318,743, filed on Jun. 30, 2014, which is a continuation application of co-pending application Ser. No. 13/942,898, filed on Jul. 16, 2013, which is a divisional application of application Ser. No. 12/512,123, filed on Jul. 30, 2009 (now U.S. Pat. No. 8,519,995), which claims the benefit of Taiwan application Serial No. 97130110, filed Aug. 7, 2008. The contents of all the foregoing applications are incorporated herein by reference.

BACKGROUND

Display devices are available in many forms for a wide range of applications. For example, a multi-view display may display two images (i.e., dual-view display). A dual-view display may divide its pixels into two groups with a first group of pixels providing a first image and a second group of pixels providing a second image. A barrier (e.g., lenticular sheet) may guide the first and second images in different view angles. For instance, the first and second images may be respectively guided toward front and side view angles.

Because, multi-view displays may display images at different view angles, a multi-view display may include a multi-domain vertical alignment (MVA) liquid crystal display (LCD) panel. MVAs may provide wide view angles. However, in a multi-view MVA LCD panel a first group of pixels for displaying a first image and a second group of pixels for displaying a second image may each correspond to different gamma curves. Therefore, the two displayed images may suffer color shift.

To address color shift, circuitry may be used to divide a pixel area into sub-pixel areas having different levels of luminance. However, doing so may reduce light transmittance, reduce light utilization efficiency, and increase costs. Therefore, it is desirable to avoid color shift while displaying images at different view angles and maintaining acceptable light transmittance, light utilization efficiency, and costs.

BRIEF DESCRIPTION OF THE DRAWINGS

The accompanying drawings are included to provide a further understanding of various embodiments of the invention, and are incorporated in and constitute a part of this specification. The drawings illustrate embodiments of the invention and, together with the description, serve to explain the principles of the invention.

DETAILED DESCRIPTION

The following description refers to the accompanying drawings. Among the various drawings the same reference numbers may be used to identify the same or similar elements. While the following description provides a thorough understanding of various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions, well known devices, circuits, and methods have been omitted to avoid clouding the description of various embodiments of the invention with unnecessary detail.

Figure 1A:
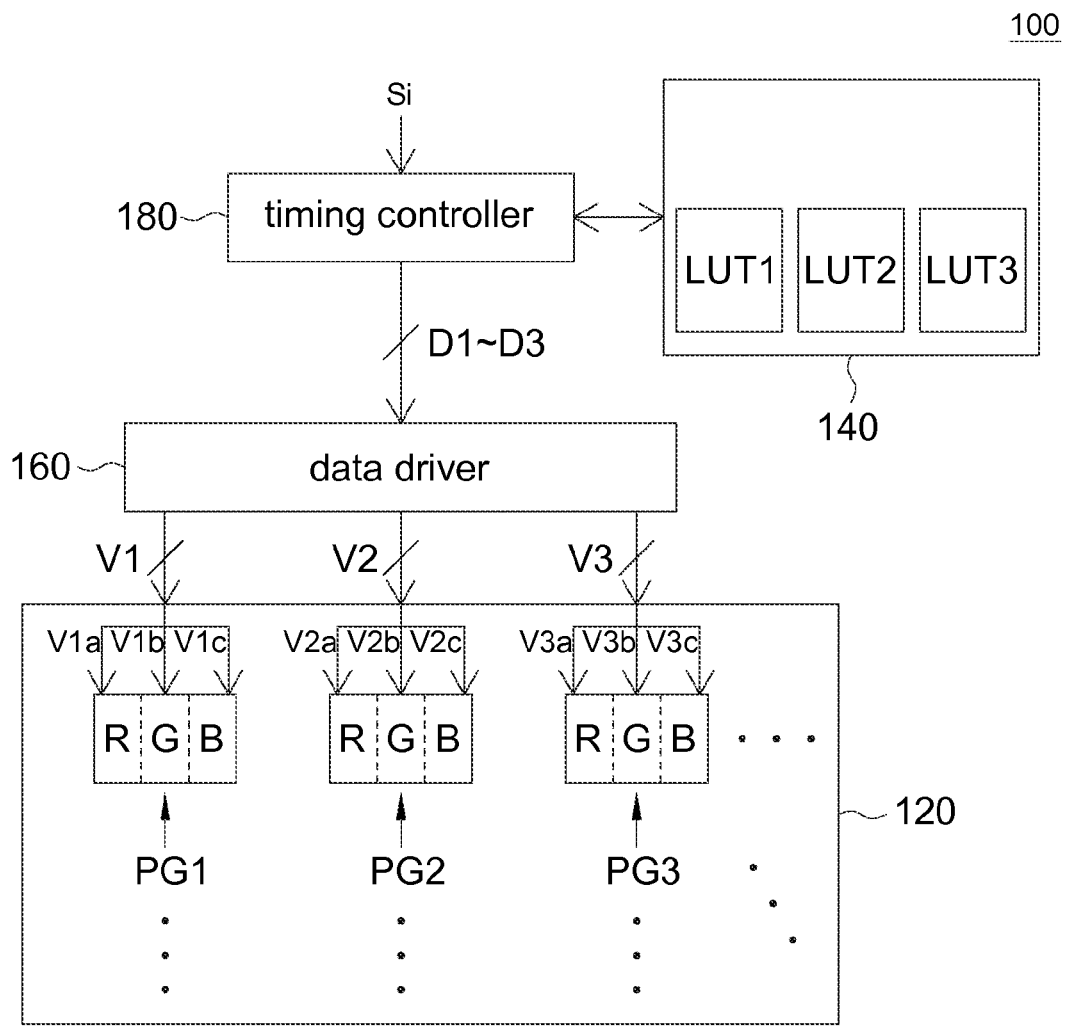
FIG. 1A is a schematic diagram of a display device according to an embodiment of the invention.

FIG. 1A is a schematic diagram of a display device according to an embodiment of the invention. Display device 100 may display an image according to frame signal Si. Display device 100 may include display panel 120, storage unit 140, and data driver 160. Display panel 100 may include pixel groups PG1, PG2, PG3. Each group may include a first color pixel (e.g., red pixel R), second color pixel (e.g., green pixel G), and third color pixel (e.g., blue pixel B). Storage unit 140 may store, for example, look-up tables LUT1, LUT2, LUT3. Data driver 160 may drive [a] PG1 based on frame signal Si and look-up table LUT1, [b] PG2 based on frame signal Si and look-up table LUT2, and [c] PG3 based on frame signal Si and look-up table LUT3.

In one embodiment of the invention, display device 100 may includes timing controller 180. Timing controller 180 may load look-up tables LUT1-LUT3, or any combination thereof, from storage unit 140 when display device 100 is powered on. Loading can occur at other times as well. Look-up tables LUT1-LUT3 may respectively reflect relationships between frame signal Si and pixel data groups D1, D2, D3. Thus, for example, after timing controller 180 receives frame signal Si, timing controller 180 may output pixel data D1-D3 to data driver 160 according to look-up tables LUT1-LUT3. After timing controller 180 receives frame signal Si, timing controller 180 may output pixel data D1 according to or based on look-up table LUT1, pixel data D2 according to look-up table LUT2, and pixel data D3 according to look-up table LUT3.

After data driver 160 receives pixel data D1-D3, data driver 160 may drive pixel groups PG1-PG3. For example, data driver 160 may output first voltage group V1 based on pixel data D1 to drive the first pixel group PG1. Data driver 160 may output second voltage group V2 based on pixel data D2 to drive the second pixel group PG2. Data driver 160 may also output third voltage group V3 based on pixel data D3 to drive the third pixel group PG3. Thus, pixel groups PG1-PG3 may be driven based on the relationships between frame signal Si and pixel data D1-D3 reflected, (e.g., recorded) in look-up tables LUT1-LUT3.

Figure 1B:
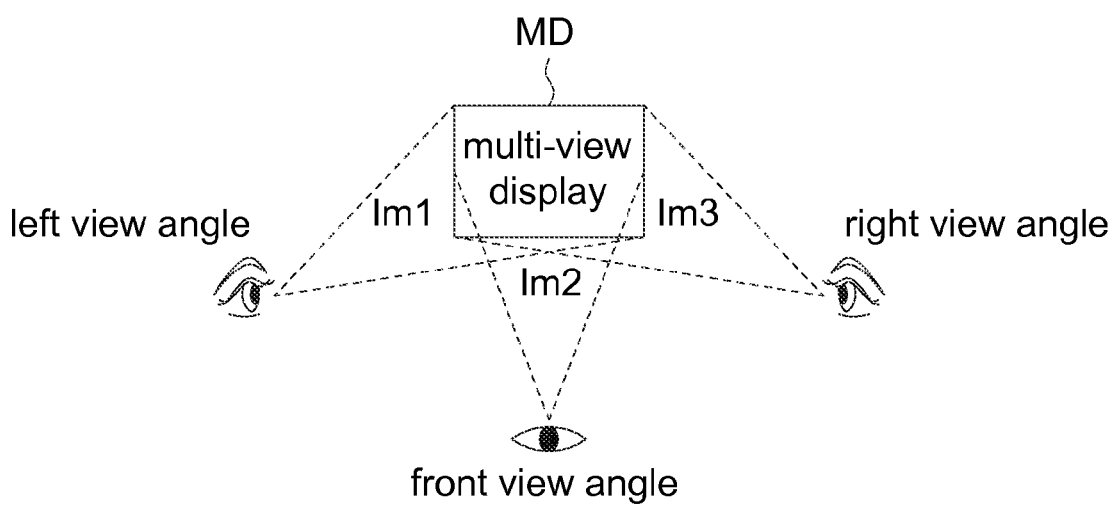
FIG. 1B is a multi-view display device according to an embodiment of the invention.

In an embodiment of the invention, display device 100 may include a multi-view display such as triple-view display MD in FIG. 1B. Pixel groups PG1-PG3 may respectively display images Im1, Im2, Im3 at different view angles. For example, pixel group PG1 may display image Im1 at a left view angle, pixel group PG2 may display image Im2 at a front view angle, and pixel group PG3 may display image Im3 at a right view angle. Because pixel groups PG1-PG3 respectively display images Im1-Im3 at different view angles, their respective gamma curves may differ from one another. In an embodiment of the invention, each of pixel groups PG1-PG3 may be driven based on any one of look-up tables LUT1-LUT3, each of which may include different content. Look-up tables LUT1-LUT3 may be programmed or configured based on pixel groups PG1-PG3 so that display device 100 can calibrate the respective gamma curves for each of pixel groups PG1-PG3.

After calibrating the gamma curves for each of pixel groups PG1-PG3, images Im1-Im3 may be displayed at view angles (e.g., front, left, and right view angles) with correct gray levels. Thus, in an embodiment of the invention, by accounting for the relationship between frame signal Si and pixel data D1-D3 using look-up tables LUT1-LUT3, display device 100 may display multiple images with correct gray levels at different view angles with no or reduced color shift.

For example, pixel groups PG1 and PG2 may display the same gray level. Data driver 160 may respectively output voltage groups V1, V2 to pixel groups PG1, PG2 according to frame signal Si. When frame signal Si is configured for displaying the same gray level on pixel groups PG1, PG2, voltage groups V1 and V2 may be different.

When driving pixel groups PG1, PG2, such groups may respectively correspond to look-up tables LUT1, LUT2. Thus, even if pixel groups PG1, PG2 are configured to display the same gray level, voltage groups V1, V2, which are respectively used to drive pixel groups PG1, PG2, may be different.

For example, voltage group V1 may include voltages V1a, V1b, V1c to respectively drive red pixel R, green pixel G, and blue pixel B of pixel group PG1. Voltage group V2 may include voltages V2a, V2b, V2c to respectively drive red pixel R, green pixel G, and blue pixel B of pixel group PG2. Because pixel groups PG1, PG2 respectively correspond to look-up tables LUT1, LUT2, voltage V1a output from data driver 160 may be different from voltage V2a, voltage V1b may be different from voltage V2b, and voltage V1c may be different from voltage V2c.

As another example, pixel groups PG1, PG2 may display the same color. Each of pixel group PG1, PG2 may have a color pixel. The color pixel, for example, may be any of red pixel R, green pixel G, and blue pixel B. Regarding red pixel R for example, based on frame signal Si data driver 160 may output voltage V1a to red pixel R of pixel group PG1, and output voltage V2a to red pixel R of pixel group PG2. When frame signal Si is configured to display the color corresponding to red pixel R in pixel groups PG1 and PG2 (i.e., pixel groups PG1 and PG2 each display red images having the same gray level with each other), voltages V1a and V2a output from data driver 160 may be different. Thus, inputting unequal voltages (e.g., V1a,V2a) to red color pixels (e.g., R from PG1 and R from PG2), which are to display the same image data but at differing view angles, may lessen or prevent color shift that might otherwise occur.

In an embodiment of the invention, the display panel of the display device may be switched between a multi-view display mode and a single-view display mode. When the display panel is in the multi-view display mode, the first and second pixel groups may display first and second images respectively. In this mode, the first and second look-up tables may have different content or configurations and may be used to calibrate gamma curves for the first and second pixel groups respectively. However, when the display panel is in the single-view display mode the first and second pixel groups may collectively display a single frame. In this mode, the first and second look-up tables may have substantially the same content or configurations and may be used to respectively calibrate gamma curves for the first and second pixel groups that collectively display a single frame.

In an embodiment of the invention, pixel groups may be driven based on look-up tables so that the display device displays multiple images with correct gray levels at different view angles with little or no color shift. Moreover, display panel pixels may be divided into pixel groups according to the display panel properties. This may produce a multi-view display device with wide view angles and properly calibrated gamma curves for each pixel group.

Figure 2:
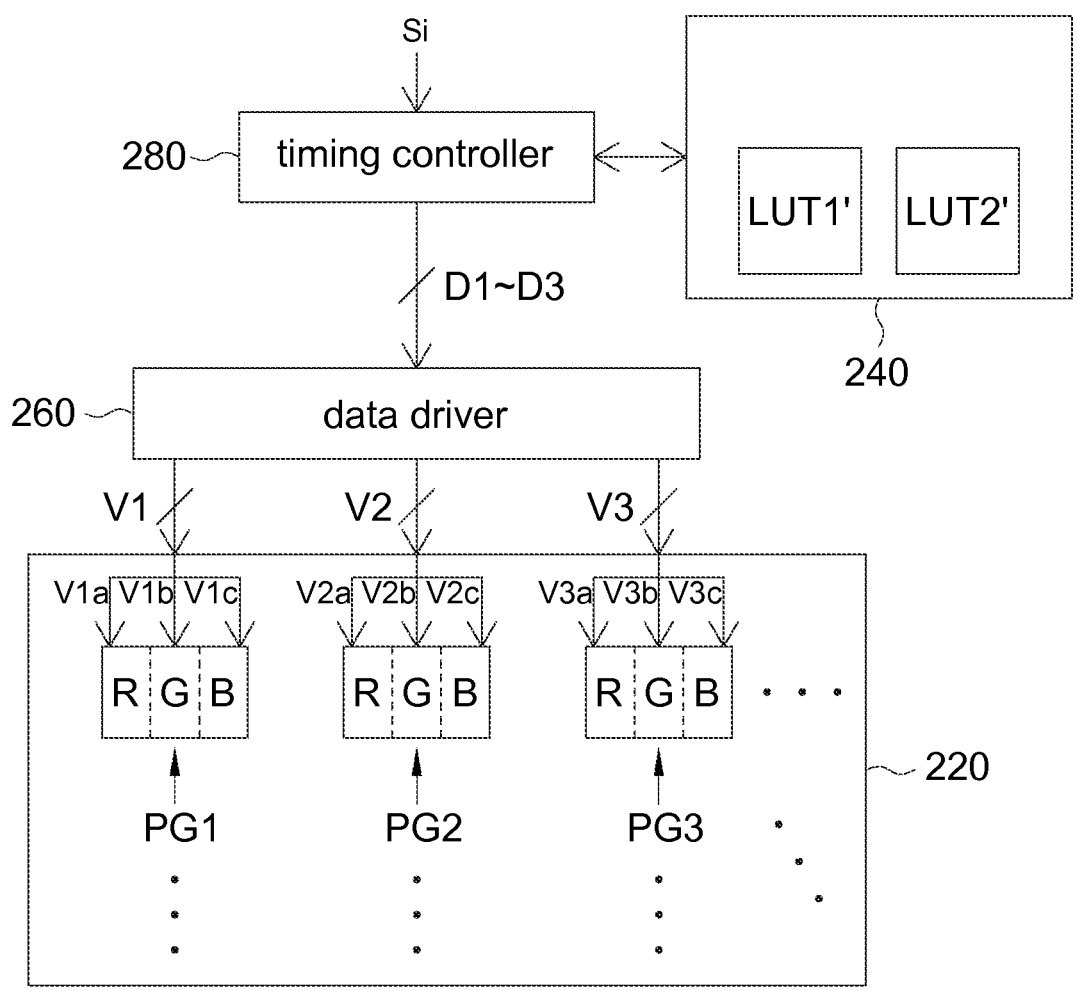
FIGS. 2-4 are schematic diagrams of display devices according to embodiments of the invention.

FIG. 2 is a schematic diagram of a display device according to an embodiment of the invention. Storage unit 240 of display device 200 may store look-up tables LUT1', LUT2'. Data driver 260 may drive [a] pixel group PG2 based on frame signal Si and look-up table LUT1', and [b] pixel groups PG1, PG3 based on frame signal Si and look-up table LUT2'.

Display device 200 may be used in a multi-view display. In triple-view display MD shown in FIG. 1B, pixel group PG1 may display image Im1 at a left view angle, and pixel group PG3 may display image Im3 at a right view angle. Each angle may be regarded as a side-view angle. In one embodiment, the left and right view angles are symmetric with respect to the front view angle. Pixel groups PG1, PG3 may respectively display images Im1, Im3 at side view angles with similar gamma curves. Thus, in an embodiment of the invention, pixel groups PG1, PG3 may share look-up table LUT2'. For example, display device 100 may calibrate a gamma curve for both pixel groups PG1, PG3 according to the same look-up table LUT2'. Thus, images Im1-Im3, displayed at the front, left, and right view angles will have correct gray levels. Therefore, display device 200 may display multiple images with correct gray levels at different view angles with little or no color shift.

Figure 3:
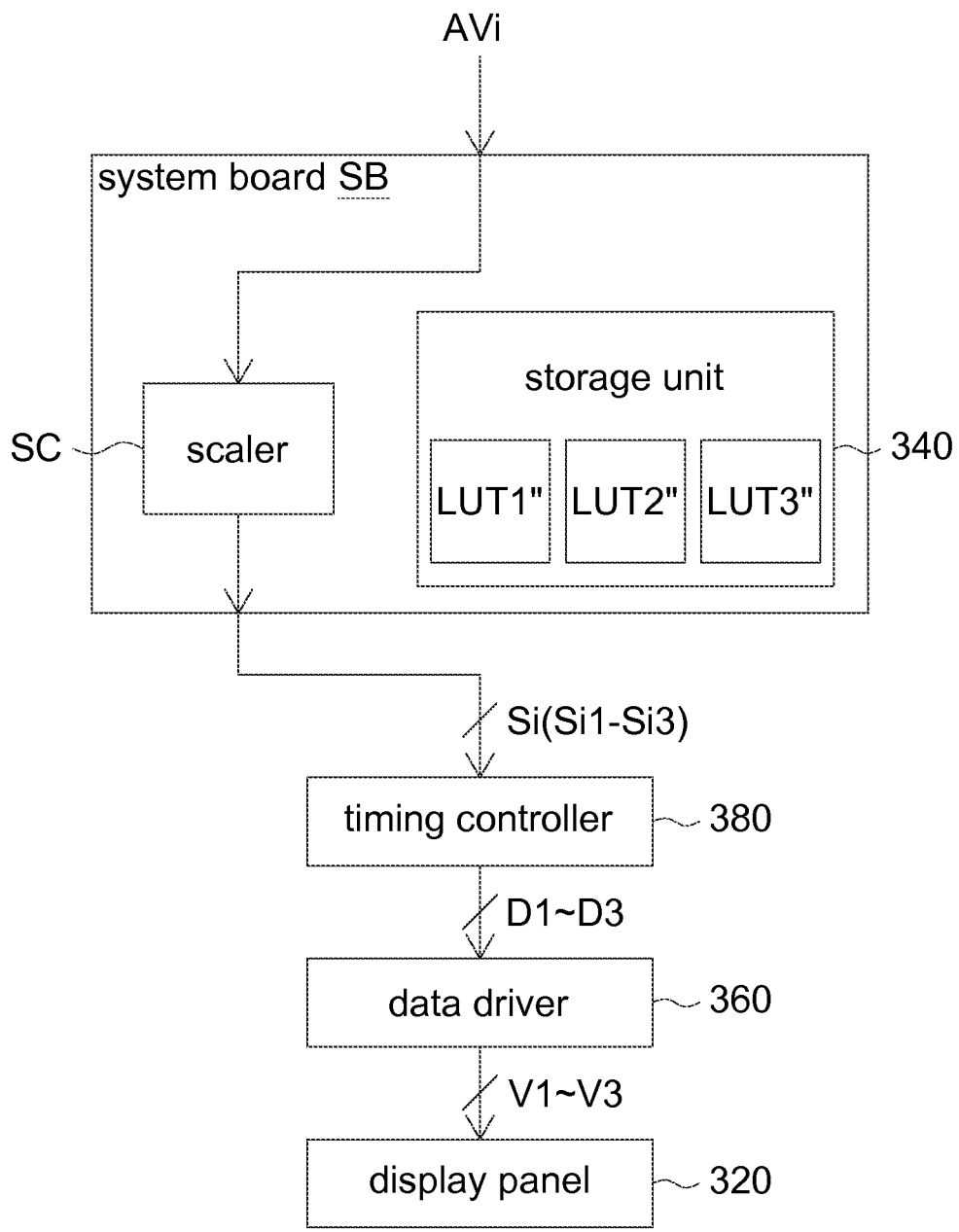

As mentioned above, multiple look-up tables may be used with a timing controller, but the invention is not limited thereto. For example, look-up tables may be used with a system board. FIG. 3 is a schematic diagram of a display device according to an embodiment of the invention. Display device 300 may include a system board SB that includes scaler SC. Storage unit 340 may be included with system board SB. Frame signal Si, for example, may include sub-frame signals Si1, Si2, Si3, which may respectively correspond to pixel data D1-D3. Storage unit 340 may include multiple look-up tables, such as look-up tables LUT1"-LUT3". Look-up tables LUT1"-LUT3" may be based on a relationship between video signal AVi and sub-frame signals Si1-Si3 respectively. Scaler SC may respectively provide frame signal Si, having sub-frame signals Si1-Si3, according to look-up tables LUT1"-LUT3".

Timing controller 380 may receive sub-frame signals Si1-Si3 of frame signal Si and may generate pixel data groups D1-D3, which correspond to Si1-Si3. Data driver 360 may drive display panel 320, having multiple pixel groups, based on pixel data D1-D3. Operations of various embodiments of timing controller 380, data driver 360, and display panel 320 have been addressed above. Moreover, while three groups of look-up tables are addressed herein, the invention is not limited thereto. For example, storage unit 340 may include two look-up tables, and an embodiment of the invention may use the two look-up tables as described above. Thus, display device 300 may display multiple images with correct gray levels at different view angles with little or no color shift.

Figure 4:
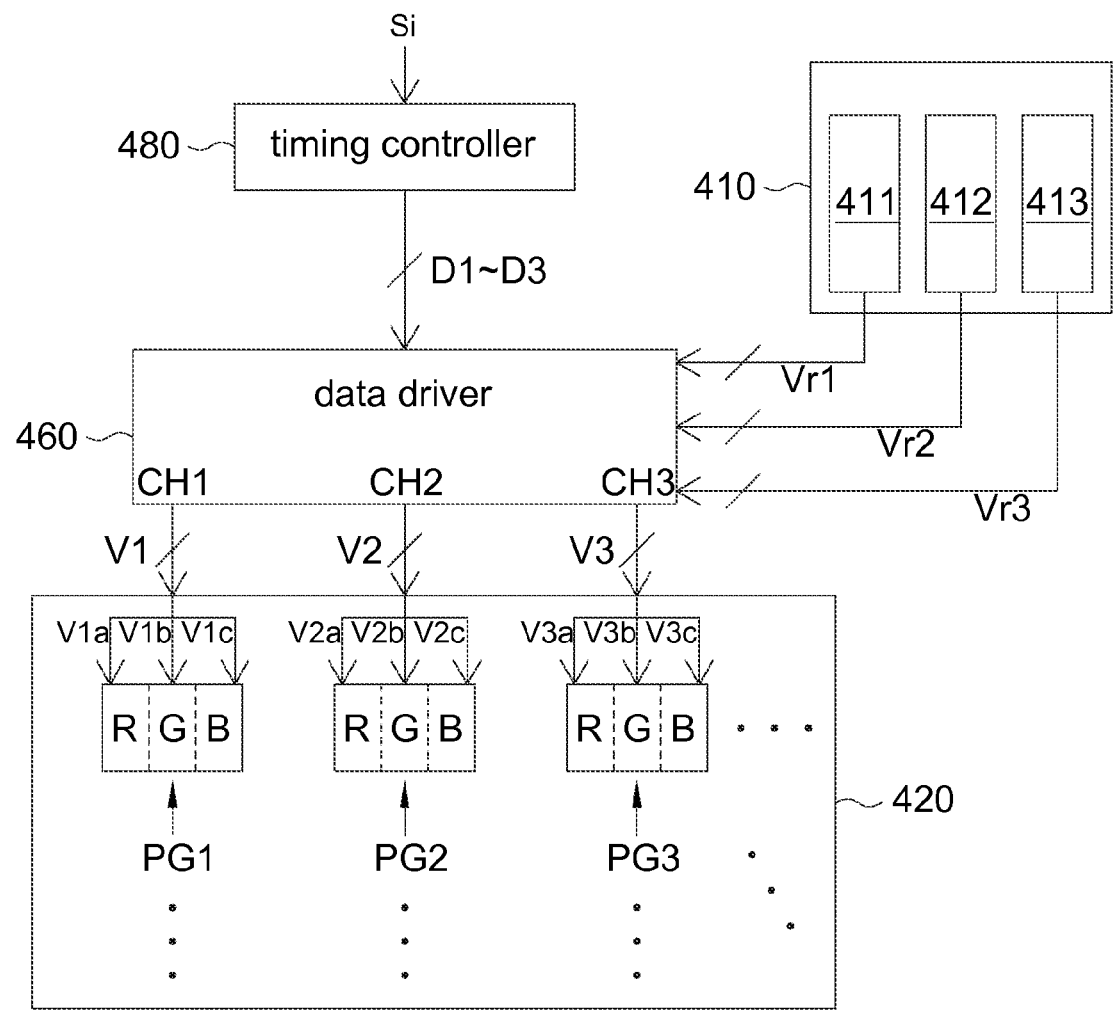

FIG. 4 is a schematic diagram of a display device according to an embodiment of the invention. Display device 400 may not include a storage unit but may include gamma voltage generating circuitry 410. Gamma voltage generating circuit 410, for example, may include gamma voltage generators 411, 412, 413, which respectively may generate first, second, and third reference voltage groups Vr1, Vr2, Vr3. Data driver 460 may drive [a] pixel group PG1 according to frame signal Si and reference voltage group Vr1, [b] pixel group PG2 according to frame signal Si and reference voltage group Vr2, and [c] pixel group PG3 according to frame signal Si and reference voltage group Vr3. Thus, gamma voltage generators 411-413 may be configured according to gamma curves of pixel groups PG1-PG3.

Figure 5:
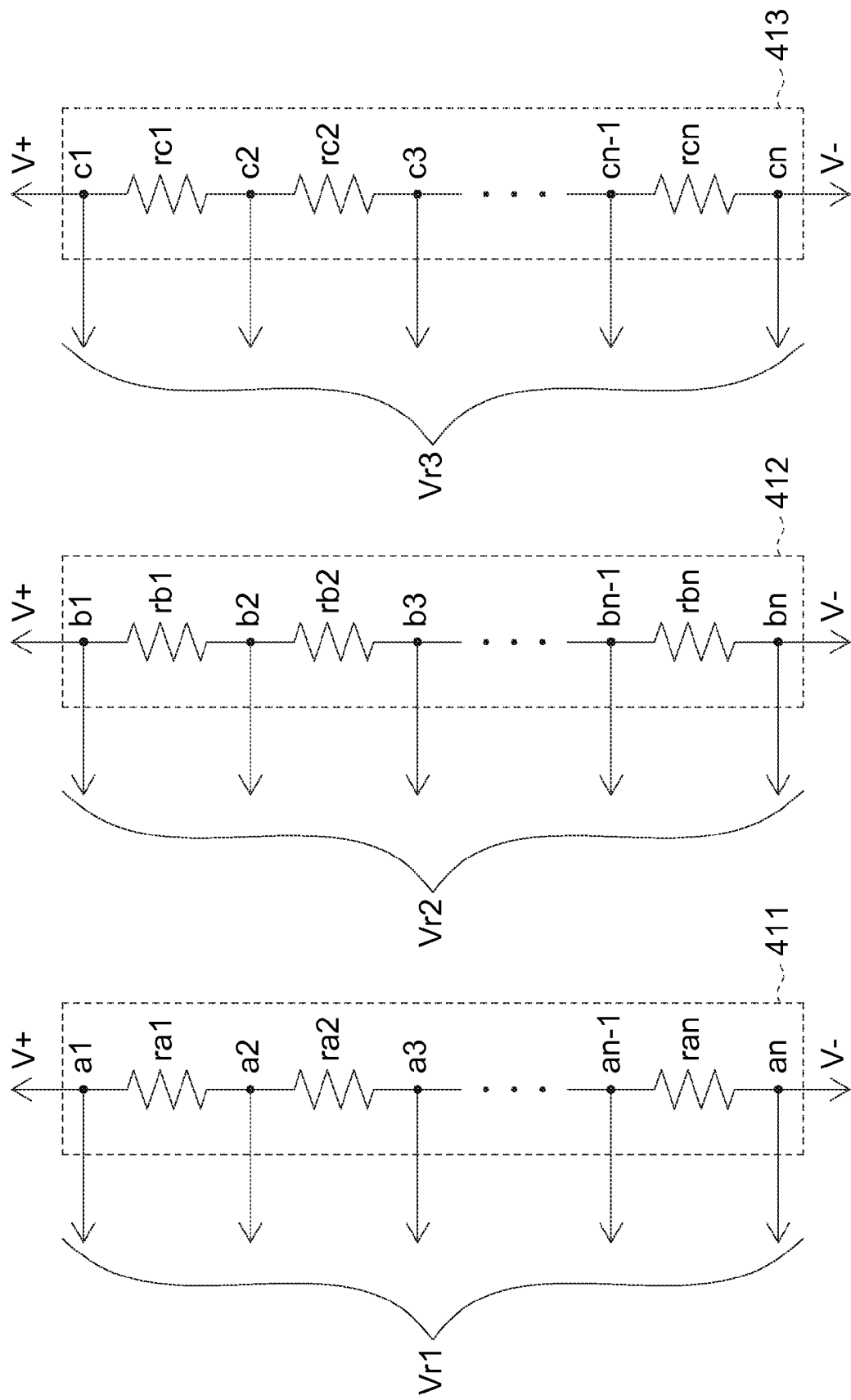
FIG. 5 is a schematic diagram of gamma voltage generators according to an embodiment of the invention.

FIG. 5 is a schematic diagram of gamma voltage generators according to an embodiment of the invention. Gamma voltage generator 411 may include a number of resistor strings ra(1), ra(2) . . . ra(n) having multiple nodes a(1), a(2) . . . a(n), and reference voltage group Vr1 may be generated by gamma voltage generator 411 from nodes a(1)-a(n). Reference voltage group Vr2 may be generated by gamma voltage generator 412 from nodes b(1)-b(n) of resistor strings rb(1)-rb(n), and reference voltage group Vr3 may be generated by gamma voltage generator 413 from nodes c(1)-c(n) of resistor strings rc(1)-re(n). Thus, gamma voltage generators 411-413 may be configured to generate different reference voltages Vr1-Vr3 based on a combination of different resistor strings.

In one embodiment of the invention, display device 400 may be used in a multi-view display. In triple-view display MD shown in FIG. 1B, resistor strings can be configured to calibrate gamma curves for pixel groups PG1-PG3 so that display device 400 may display multiple images with correct gray levels at different view angles with little to no color shift.

In FIG. 4, data driver 460 may include three channel groups CH1, CH2, CH3. CH1-CH3 may respectively output voltage groups V1-V3. The properties of channel groups CH1-CH3, which may correspond to frame signal Si, may differ from each other. For example, data driver 460 may employ reference voltage groups Vr1-Vr3 so channel groups CH1-CH3 have different driving properties.

For example, assume red pixel R is to be driven and pixel data D1-D3 have the same data content. When timing controller 480 receives frame signal Si for displaying a red image and outputs pixel data D1-D3 to data driver 460, data driver 460 may receive pixel data D1-D3 and respectively output voltages V1a, V1b, V1c to red pixel R of the first to third pixel groups PG1-PG3 via the first to third channel groups CH1-CH3. Meanwhile, even if received pixel data D1-D3 have the same data content, the driving properties of channel groups CH1-CH3 may differ from each other because data driver 460 may employ different reference voltage groups Vr1-Vr3. Thus, voltages V1a, V1b, V1c output to channel groups CH1-CH3 by data driver 460, may differ from each other.

In an embodiment of the invention, the gamma voltage generating circuit may include two gamma voltage generators which respectively generate first and second reference voltage groups. The data driver may drive [a] pixel group PG2 according to the frame signal and the first reference voltage group, and [b] both pixel groups PG1, PG3 according to the frame signal and the second reference voltage group, so that the first and third pixel groups PG1, PG3 share voltage generated by one of the gamma voltage generators.

According to various embodiments of the invention, gamma curves for multiple pixel groups can be calibrated using look-up tables or by using reference voltage groups provided by gamma voltage generators so that the pixels can display multiple images with correct gray levels at different view angles. Therefore, color shift can be avoided or lessened without necessarily using extra circuitry on the display panel. Also, any related light transmittance or light utilization efficiency reduction may be decreased or eliminated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A display device comprising:
   a display panel including first and second pixel groups, wherein each of the pixel groups includes a color pixel, and the color pixel of the first pixel group and the color pixel of the second pixel group are with the same color;
   a data driver, based on a frame signal, providing a plurality of color voltages, and the color pixel of the first pixel group having a first color voltage and the color pixel of the second pixel group having a second color voltage; and
   a gamma voltage generating circuit, electrically connecting with the data driver;
   wherein the first color voltage differs from the second color voltage when the frame signal is configured to display an equal gray level.

2. The display device of claim 1, wherein the data driver is configured to drive the first pixel group to display a first image and the second pixel group to display a second image.

3. The display device of claim 1, wherein the gamma voltage generating circuit is directly electrically connecting with the data driver.

4. A display device comprising:
   a data driver, based on a frame signal, providing a plurality of color voltages;
   a display panel including first and second pixel groups, wherein each of the pixel groups includes a color pixel driven by the data driver; and
   a gamma voltage generating circuit, electrically connecting with the data driver;
   wherein the color pixel of the first pixel group and the color pixel of the second pixel group are with the same color, and the color pixel of the first pixel group has a first color voltage and the color pixel of the second pixel group has a second color voltage;
   wherein the first color voltage differs from the second color voltage when the frame signal is configured to display an equal gray level.

5. The display device of claim 4, wherein the data driver is configured to drive the first pixel group to display a first image and the second pixel group to display a second image.

6. The display device of claim 4, wherein the gamma voltage generating circuit is directly electrically connecting with the data driver.

* * * * *